United States Patent
Pearce

(10) Patent No.: US 9,468,137 B1
(45) Date of Patent: Oct. 18, 2016

(54) PLANT EXTRACTING ASSEMBLY HAVING DETENT

(71) Applicant: Curtis Arthur Pearce, Grants Pass, OR (US)

(72) Inventor: Curtis Arthur Pearce, Grants Pass, OR (US)

(*) Notice: Subject to any disclaimer, the term of this patent is extended or adjusted under 35 U.S.C. 154(b) by 24 days.

(21) Appl. No.: 14/283,140

(22) Filed: May 20, 2014

(51) Int. Cl.
*A01G 23/06* (2006.01)
*A01B 1/16* (2006.01)
*A01G 23/00* (2006.01)

(52) U.S. Cl.
CPC ............... *A01B 1/16* (2013.01); *A01G 23/06* (2013.01)

(58) Field of Classification Search
CPC ........... A01B 1/16; A01B 1/18; A01D 9/06; A01G 23/00; A01G 23/06; B25B 7/123; B66F 17/00; B66F 19/00
USPC ............ 254/132, 120, 134, 19, 21; 294/50.4
See application file for complete search history.

(56) References Cited

U.S. PATENT DOCUMENTS

| | | | | |
|---|---|---|---|---|
| 216,090 A * | 6/1879 | Hodges | ..................... | A01B 1/16 254/132 |
| 229,776 A * | 7/1880 | Thompson | ............... | A01B 1/16 254/132 |
| 334,577 A * | 1/1886 | Anderberg et al. | ...... | D01C 3/00 256/63 |
| 367,328 A * | 7/1887 | Todd | ........................ | A01B 1/16 254/132 |
| 638,169 A * | 11/1899 | Bloodgood et al. | ..... | A01B 1/16 254/132 |
| 711,693 A * | 10/1902 | Bloodgood | .............. | A01B 1/16 254/132 |
| 935,020 A * | 9/1909 | Harvey | ..................... | A01B 1/16 254/132 |
| 1,024,328 A * | 4/1912 | Grosser | .................... | A01B 1/18 294/50.9 |
| 1,452,753 A * | 4/1923 | Otto | ........................ | B25B 5/102 269/166 |
| 2,125,619 A * | 8/1938 | Parent | .................. | A47B 63/067 211/121 |
| 2,178,792 A * | 11/1939 | Holmboe | ................ | E04G 25/08 254/104 |
| 2,379,107 A * | 6/1945 | Scheck | .................... | B25B 7/123 269/208 |
| 2,876,814 A * | 3/1959 | Leister | .................... | B25B 5/067 269/140 |
| 4,181,289 A * | 1/1980 | Koffski | ..................... | B66F 1/02 254/107 |
| 4,576,367 A * | 3/1986 | Horn | ....................... | B25B 5/122 269/228 |
| 4,856,759 A * | 8/1989 | Ness | ...................... | A01G 23/06 254/132 |
| 5,255,471 A * | 10/1993 | Shaw | .................. | E05B 63/0052 16/370 |
| 5,671,988 A * | 9/1997 | O'Neill | ................ | A47B 88/047 312/333 |
| 6,123,326 A * | 9/2000 | Kleinbongartz | ........ | B25B 5/068 269/143 |
| D609,540 S * | 2/2010 | Oberg | ............................. | D8/51 |

* cited by examiner

*Primary Examiner* — Joseph J Hail
*Assistant Examiner* — Arman Milanian
(74) *Attorney, Agent, or Firm* — Jerry Haynes Law

(57) ABSTRACT

A plant extracting assembly includes a fulcrum; a lifting arm subassembly carried by the fulcrum in fixed relation thereto, the lifting arm subassembly having a lifting arm jaw; a kinetic arm subassembly having a kinetic arm jaw disposed in facing relation to the lifting arm jaw of the lifting arm subassembly; and a pivoting lever carried by the lifting arm subassembly and pivotally engaging the kinetic arm subassembly, the lever operable to selectively displace the kinetic arm jaw toward and away from the lifting arm jaw by pivotal actuation of the kinetic arm subassembly responsive to pivoting of the lever relative to the fulcrum.

18 Claims, 5 Drawing Sheets

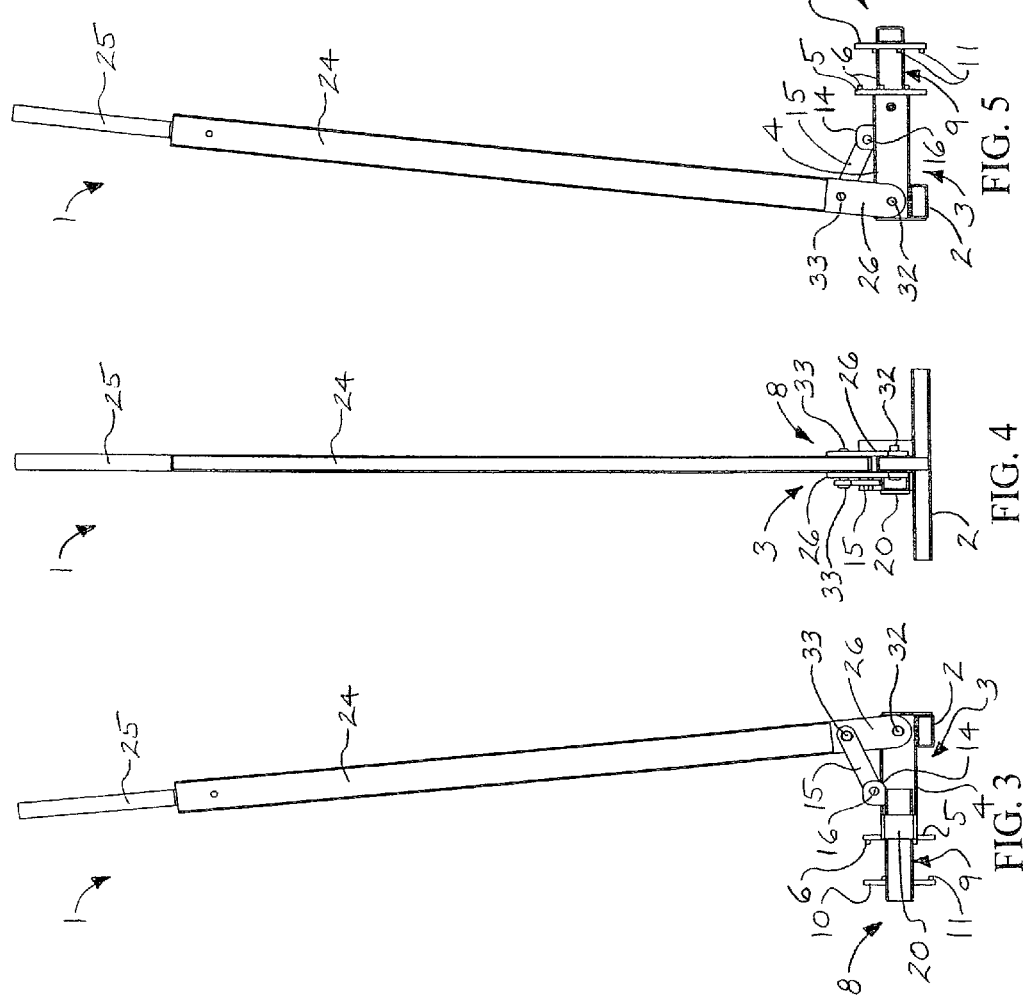

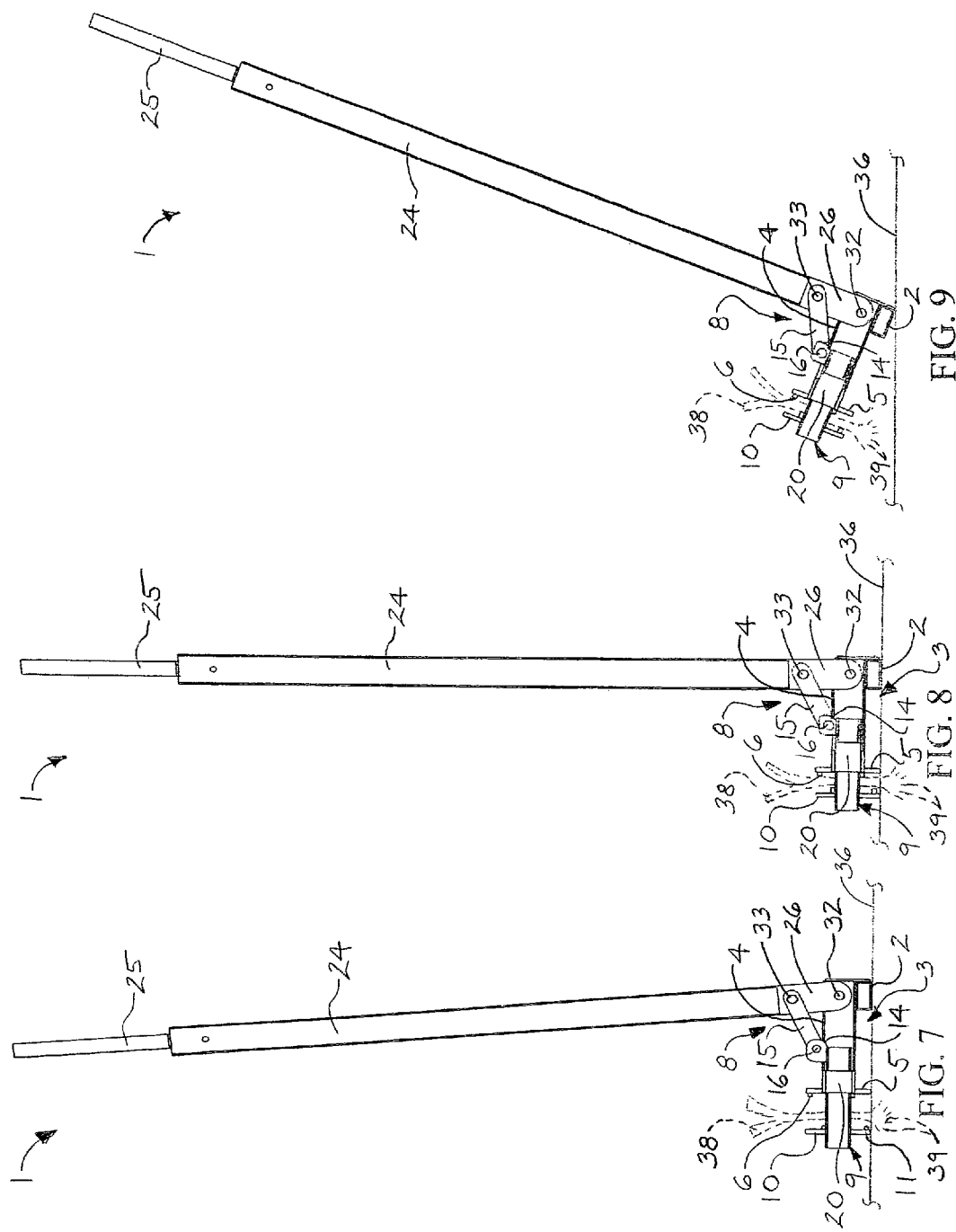

PLANT EXTRACTING ASSEMBLY HAVING DETENT

FIELD OF THE INVENTION

Illustrative embodiments of the disclosure are generally directed to devices for extracting weeds, woody plants and other vegetation from the ground. More particularly, illustrative embodiments of the disclosure relate to a plant extracting assembly which utilizes leverage to extract woody plants and other vegetation having extensive roots from the ground.

BACKGROUND OF THE INVENTION

Undesirable or invasive vegetation is frequently removed from fields, roadsides and natural areas where it is removed for eco system preservation (this tool is used to remove invasive or unwanted plants that can overtake and destroy areas they invade) or for some other purpose. Typical methods of removing undesirable vegetation from the ground require that a person crouch on his or her knees and pull the vegetation from the ground using the hands, or labor intensive hand tools such as a mattock. This method is, however, cumbersome and labor-intensive. Moreover, removal of undesirable vegetation having extensive roots, such as woody plants, may require that a considerable force be applied to the plant to uproot it from the ground. Frequently, the magnitude of force which must be applied to successfully uproot the plant exceeds the force which a person is capable of exerting using his or her hands. Alternately heavy machinery may be used, but this is damaging to sensitive areas and indifferent to beneficial species, which are removed as well. This method also increases the possibility of seeds from undesirable plants being moved from one site to the next increasing spread of invasive plants.

Accordingly, a plant extracting assembly which utilizes leverage to extract woody plants and other vegetation having extensive roots from the ground may be desirable for some applications.

SUMMARY OF THE INVENTION

Illustrative embodiments of the disclosure are generally directed to a plant extracting assembly which utilizes leverage to extract woody plants and other vegetation having extensive roots from the ground. An illustrative embodiment of the plant extracting assembly includes a fulcrum; a lifting arm subassembly carried by the fulcrum in fixed relation thereto, the lifting arm subassembly having a lifting arm jaw; a kinetic arm subassembly having a kinetic arm jaw disposed in facing relation to the lifting arm jaw of the lifting arm subassembly; and a pivoting lever carried by the lifting arm subassembly and pivotally engaging the kinetic arm subassembly, the lever operable to selectively displace the kinetic arm jaw toward and away from the lifting arm jaw by pivotal actuation of the kinetic arm subassembly responsive to pivoting of the lever relative to the fulcrum.

BRIEF DESCRIPTION OF THE DRAWINGS

Illustrative embodiments of the disclosure will now be described, by way of example, with reference to the accompanying drawings, in which:

FIG. 3 is a left side view of an illustrative plant extracting assembly;

FIG. 4 is a rear view of an illustrative plant extracting assembly;

FIG. 5 is a right side view of an illustrative plant extracting assembly;

FIG. 7 is a left side view of an illustrative plant extracting assembly, with the lifting arm jaw and the kinetic arm jaw deployed in an open configuration on opposite sides of a plant which is to be removed from the ground in exemplary application of the assembly;

FIG. 8 is a left side view of the illustrative plant extracting assembly, with the lifting arm jaw and the kinetic arm jaw deployed in a closed configuration against the plant which is to be removed from the ground; and FIG. 9 is a left side view of the illustrative plant extracting assembly, with the lifting arm jaw and the kinetic arm jaw deployed in a closed configuration against the plant and the assembly pivoted on the ground to uproot the plant from the ground.

DETAILED DESCRIPTION

Figure 1:
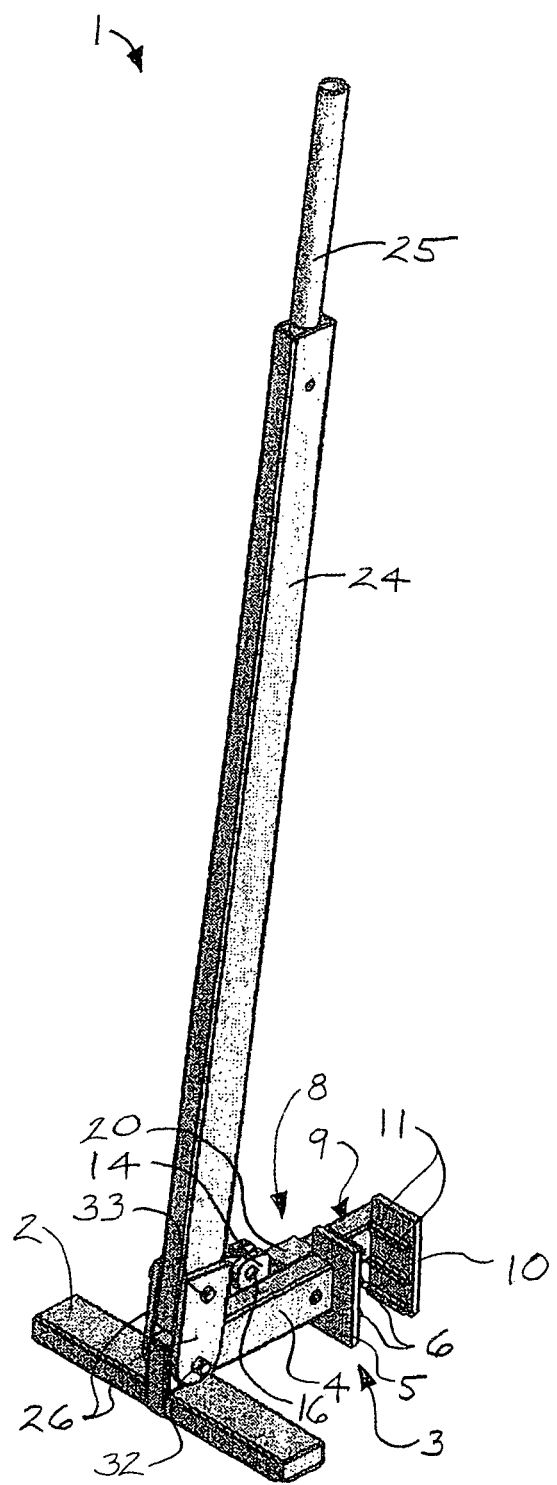
FIG. 1 is a rear perspective view of an illustrative embodiment of the plant extracting assembly.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is non-limiting and is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "upper", "lower", "front", 'rear", "side", "interior" and "exterior" as used herein are intended for descriptive purposes only and are not necessarily intended to be construed in a limiting sense.

Referring to the drawings, an illustrative embodiment of the plant extracting assembly is generally indicated by reference numeral 1. The plant extracting assembly 1 may include a fulcrum 2 which may be generally elongated. A lifting arm subassembly 3 may be supported by the fulcrum 2 in fixed relation thereto. The lifting arm subassembly 3 may have a lifting arm jaw 5. A kinetic arm subassembly 8 may include a kinetic arm jaw 10 which is disposed in facing relation to the lifting arm jaw 5 of the lifting arm subassembly 3. A pivoting lever 24 may be supported by the lifting arm subassembly 3. The lever 24 may pivotally engage the kinetic arm subassembly 8. Accordingly, the lever 24 may be operable to selectively displace the kinetic arm jaw 10 of the kinetic arm subassembly 8 toward and away from the stationary lifting arm jaw 5 of the lifting arm subassembly 3 by pivotal actuation of the kinetic arm subassembly 8 responsive to pivoting of the lever 24 relative to the lifting arm subassembly 3. In some embodiments, a lever handle 25 may extend from the lever 24. In exemplary application of the plant extracting assembly 1, as illustrated in FIGS. 7-9 and will be hereinafter described, a woody plant 38 rooted in the ground 36 can initially be gripped between the stationary lifting arm jaw 5 of the lifting arm subassembly 3 and the kinetic arm jaw 10 of the kinetic arm subassembly 8 by actuation of the lever 24. The fulcrum 2 of the plant extracting assembly 1 then can be selectively pivoted on the ground 36 by tilting the lever 24 away from the plant 38 to uproot the plant 38 from the ground 36.

The lifting arm subassembly 3 of the plant extracting assembly 1 may include a lifting arm 4. The lifting arm 4 may be generally elongated and disposed in perpendicular relationship to the fulcrum 2. The lifting arm jaw 5 may include a flat plate which terminates the lifting arm 4. In some embodiments, multiple gripping elements 6 may be provided on the surface of the lifting arm jaw 5 which is opposite the lifting arm 4.

Figure 2:
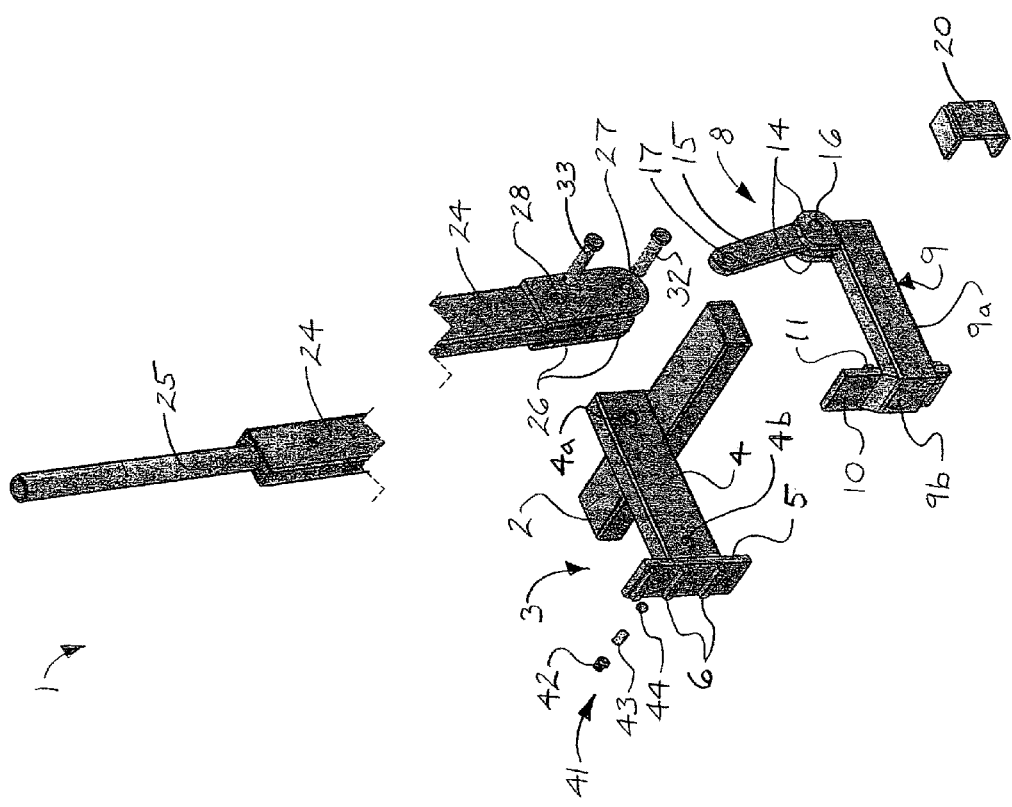
FIG. 2 is an exploded perspective view of an illustrative plant extracting assembly.

The lever 24 may be pivotally attached to the fulcrum 2 and/or to the lifting arm 4 of the lifting arm subassembly 3, as illustrated. Accordingly, as illustrated in FIG. 2, a pair of spaced-apart lever flanges 26 may terminate a lower end of the lever 24. A pair of aligned lever pivot pin openings 27 may extend through the respective lever flanges 26. A lever pivot pin 32 may extend through the aligned lever pivot pin openings 27 and through a registering lever pivot pin opening 4a which extends through the lifting arm 4 of the lifting arm subassembly 3.

The kinetic arm subassembly 8 of the plant extracting assembly 1 may include a kinetic arm 9. The kinetic arm 9 may include an elongated main arm segment 9a and a jaw segment 9b which terminates the main arm segment 9a. The jaw segment 9b may be disposed in perpendicular relationship to the main arm segment 9a. The kinetic arm jaw 10 may include a flat plate which is supported by the jaw segment 9b. In some embodiments, multiple gripping elements 11 may be provided on the surface of the kinetic arm jaw 10 which is disposed in facing relationship to the gripping elements 6 on the lifting arm jaw 5.

In some embodiments, the lever 24 may pivotally engage the kinetic arm 9 of the kinetic arm subassembly 8 through an arm linkage 15. A pair of spaced-apart linkage flanges 14 may be provided on the main arm segment 9a of the kinetic arm 9. As further illustrated in FIG. 2, a first end of the arm linkage 15 may be pivotally mounted between the linkage flanges 14 by extending a pivot pin 16 through aligned pin openings (not illustrated) in the linkage flanges 14 and through a registering pin opening (not illustrated) in the arm linkage 15. In some embodiments, the pivot pin 16 may be welded in place. A second end of the arm linkage 15 may be pivotally mounted between the lever flanges 26 on the lever 24 by extending a linkage pivot pin 33 through aligned linkage pivot pin openings 28 in the lever flanges 26 and through a registering linkage pin opening 17 in the arm linkage 15. Accordingly, the lever 24 can be selectively pivoted from the angled position illustrated in FIG. 7, in which the kinetic arm jaw 10 of the kinetic arm subassembly 8 is disposed at the maximum spacing relative to the lifting arm jaw 5 of the lifting arm subassembly 3, to the straight position illustrated in FIG. 8. This action facilitates movement of the kinetic arm jaw 10 toward the stationary arm jaw 5. Pivoting of the lever 24 from the straight position (FIG. 8) back to the angled position (FIG. 7) facilitates movement of the kinetic arm jaw 10 away from the stationary lifting arm jaw 5. The main arm segment 9a on the kinetic arm 9 of the kinetic arm subassembly 8 may be disposed in adjacent and sliding relationship to the lifting arm 4 of the lifting arm subassembly 3. Accordingly, as the lever 24 is pivoted relative to the fulcrum 2 to move the kinetic arm jaw 10 toward and away from the lifting arm jaw 5, the main arm segment 9a of the kinetic arm 9 may slide back and forth relative to the lifting arm 4 of the lifting arm subassembly 3.

Figure 6:
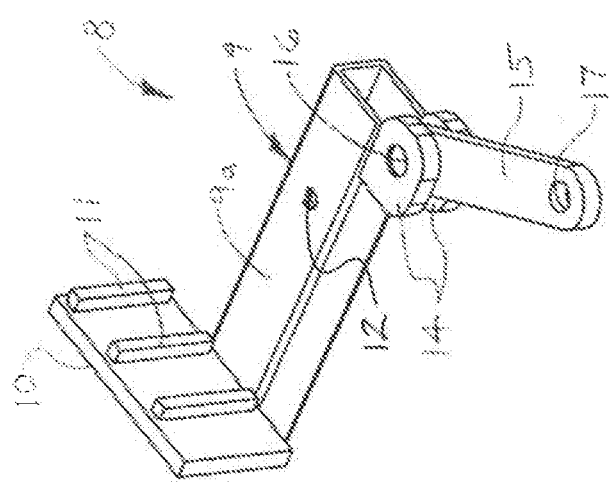
FIG. 6 is a perspective view of an exemplary kinetic arm subassembly of an illustrative plant extracting assembly.

In some embodiments, the main arm segment 9a of the kinetic arm 9 may slide back and forth within a slide bracket 20 on the lifting arm 4 of the lifting arm subassembly 3. The slide bracket 20 may be attached to the lifting arm 4 via welding, fasteners and/or other attachment technique. As illustrated in FIG. 2, in some embodiments, an arm engaging subassembly 41 may maintain smooth movement of the lifting arm 4 of the lifting arm subassembly 3 relative to the kinetic arm 9 as the main arm segment 9a slides within the slide bracket 20. Thus, an arm engaging subassembly opening 4b may be provided in the lifting arm 4. The arm engaging subassembly 41 may include an arm engaging ball 44 which is provided in the arm engaging subassembly opening 4b. A ball detent 12 (FIG. 6) may be provided in the main arm segment 9a of the kinetic arm 9. A compression spring 43 in the arm engaging subassembly opening 4b may engage and normally urge the arm engaging ball 44 into the ball detent 12 in the main arm segment 9a to hold the kinetic arm jaw 10 in the open, spaced-apart position relative to the lifting arm jaw 5. A set screw 42 threaded in the arm engaging subassembly opening 4b may engage the compression spring 43. The arm engaging subassembly 41 therefore creates a "catch" that will hold the kinetic arm jaw 10 in the open, spaced-apart position relative to the lifting arm jaw 5 while the plant extracting assembly 1 is maneuvered around the plant 38, as illustrated in FIG. 7. When the user pulls the lever 24 back while applying some resistance to the fulcrum 2 via the foot, the arm engaging ball 44 then disengages from the ball detent 12 in kinetic arm section 9a and the kinetic arm jaw 10 moves toward the stationary lifting arm jaw 5 to engage the plant 38, as illustrated in FIG. 8.

As illustrated in FIGS. 7-9, in exemplary application, the plant extracting assembly 1 may be operated to uproot a plant 38 such as a woody plant, for example and without limitation, from the ground 36. The plant 38 may have extensive roots 39 which extend beneath the ground 36 and firmly anchor the plant 38 in the ground 36. Accordingly, the fulcrum 2 of the plant extracting assembly 1 is placed on the surface of the ground 36 adjacent to the plant 38. The lever 24 may initially be deployed in the angled position relative to a vertical axis, as illustrated in FIG. 7, to maximize the spacing between the lifting arm jaw 5 and the kinetic arm jaw 10. The plant extracting assembly 1 is maneuvered to position the lifting arm jaw 5 and the kinetic arm jaw 10 on opposite sides of the plant 38.

Next, the lever 24 is pivoted from the angled position in FIG. 7 to the straight vertical position illustrated in FIG. 8. This action facilitates sliding of the main arm segment 9a of the kinetic arm 9 through the slide bracket 20 as the kinetic arm jaw 10 initially approaches and then engages the plant 38. The plant 38 therefore prevents further movement of the kinetic arm jaw 10 toward the lifting arm jaw 5 and is gripped firmly between the lifting arm jaw 5 and the kinetic arm jaw 10. Continued pivoting of the lever 24 away from the plant 38 causes the fulcrum 2 to pivot on the ground 36 as the lifting arm jaw 5 and the kinetic arm jaw 10 rise and uproot the plant 38 from the ground 36, as illustrated in FIG. 9. The plant 38 may then be discarded and the plant extracting assembly 1 may be used in like manner to uproot another plant 38 from the ground 36.

While illustrative embodiments of the disclosure have been described above, it will be recognized and understood that various modifications can be made and the appended claims are intended to cover all such modifications which may fall within the spirit and scope of the disclosure.

What is claimed is:

1. A plant extracting assembly, comprising:
    a fulcrum;
    a lifting arm subassembly carried by the fulcrum in fixed relation thereto, the lifting arm subassembly having a lifting arm jaw;
    a kinetic arm subassembly having a kinetic arm jaw disposed in facing relation to the lifting arm jaw of the lifting arm subassembly;
    a pivoting lever carried by the lifting arm subassembly and pivotally engaging the kinetic arm subassembly, the lever operable to selectively displace the kinetic arm jaw toward and away from the lifting arm jaw by pivotal actuation of the kinetic arm subassembly responsive to pivoting of the lever relative to the fulcrum; and
    an arm engaging subassembly between the lifting arm subassembly and the kinetic arm subassembly, the arm engaging subassembly maintains smooth movement of the lifting arm subassembly relative to the kinetic arm subassembly as the lever selectively displaces the kinetic arm jaw toward and away from the lifting arm jaw, the arm engaging subassembly including:
        an arm engaging subassembly opening provided in the lifting arm subassembly;
        an arm engaging ball provided in the arm engaging subassembly opening;
        a ball detent provided in the kinetic arm subassembly;
        a compression spring in the arm engaging subassembly opening and engaging and normally urging the arm engaging ball into the ball detent to hold the kinetic arm jaw in an open, spaced-apart position relative to the lifting arm jaw; and
        a set screw threaded into the arm engaging subassembly opening and engaging the compression spring, the set screw configured to selectively vary resistance of the arm engaging ball against the ball detent.

2. The plant extracting assembly of claim 1 wherein the lifting arm subassembly comprises an elongated lifting arm carried by the fulcrum, and wherein the lifting arm jaw terminates the lifting arm.

3. The plant extracting assembly of claim 2 wherein the lifting arm is disposed in generally perpendicular relationship to the fulcrum.

4. The plant extracting assembly of claim 1 wherein the kinetic arm subassembly comprises an elongated kinetic arm pivotally engaged by the lever, and wherein the kinetic arm jaw terminates the kinetic arm.

5. The plant extracting assembly of claim 4 wherein the kinetic arm comprises an elongated main arm segment pivotally engaged by the lever and a jaw segment terminating and disposed in perpendicular relationship to the main arm segment, and wherein the kinetic arm jaw is carried by the jaw segment.

6. The plant extracting assembly of claim 5 further comprising an arm linkage pivotally connecting the lever and the main arm segment of the kinetic arm.

7. The plant extracting assembly of claim 1 wherein each of the lifting arm jaw and the kinetic arm jaw comprises a flat plate.

8. The plant extracting assembly of claim 7 further comprising a plurality of gripping elements on each of the lifting arm jaw and the kinetic arm jaw.

9. A plant extracting assembly, comprising:
    an elongated fulcrum;
    a lifting arm subassembly carried by the fulcrum in fixed relation thereto, the lifting arm subassembly having a lifting arm jaw;
    a kinetic arm subassembly having a kinetic arm jaw disposed in parallel, spaced-apart and facing relation to the lifting arm jaw of the lifting arm subassembly;
    an elongated pivoting lever upward-standing from and carried by the lifting arm subassembly and pivotally engaging the kinetic arm subassembly, the lever operable to selectively displace the kinetic arm jaw toward and away from the lifting arm jaw by pivotal actuation of the kinetic arm subassembly responsive to pivoting of the lever relative to the fulcrum;
    an arm linkage pivotally connecting the lever and the main arm segment of the kinetic arm, the arm linkage having a first end pivotally connected to the lever and a second end pivotally connected to the main arm segment of the kinetic arm;
    an arm engaging subassembly including:
        an arm engaging subassembly opening provided in the lifting arm;
        an arm engaging ball provided in the arm engaging subassembly opening;
        a ball detent provided in the kinetic arm;
        a compression spring in the arm engaging subassembly opening and engaging and normally urging the arm engaging ball into the ball detent to hold the kinetic arm jaw in an open, spaced-apart position relative to the lifting arm jaw; and
        a set screw threaded into the arm engaging subassembly opening and engaging the compression spring, the set screw configured to selectively vary resistance of the arm engaging ball against the ball detent.

10. The plant extracting assembly of claim 9 wherein the lifting arm jaw terminates the lifting arm.

11. The plant extracting assembly of claim 10 wherein the lifting arm is disposed in generally perpendicular relationship to the fulcrum.

12. The plant extracting assembly of claim 9 wherein the kinetic arm jaw terminates the kinetic arm.

13. The plant extracting assembly of claim 12 wherein the kinetic arm comprises an elongated main arm segment pivotally engaged by the lever and a jaw segment terminating and disposed in perpendicular relationship to the main arm segment, and wherein the kinetic arm jaw is carried by the jaw segment.

14. The plant extracting assembly of claim 9 wherein each of the lifting arm jaw and the kinetic arm jaw comprises a flat plate.

15. The plant extracting assembly of claim 14 further comprising a plurality of gripping elements on each of the lifting arm jaw and the kinetic arm jaw.

16. A plant extracting assembly, comprising:
    an elongated fulcrum;
    a lifting arm subassembly including:
        an elongated lifting arm carried by the fulcrum in fixed relation thereto, the lifting arm disposed in perpendicular relationship to the fulcrum; and
        a lifting arm jaw terminating the lifting arm;

a kinetic arm subassembly including:
- a kinetic arm carried by the lifting arm of the lifting arm subassembly in sliding relation thereto, the kinetic arm including:
  - an elongated main arm segment slidably carried by the lifting arm; and
  - a jaw segment terminating and disposed in perpendicular relationship to the main arm segment;
- a kinetic arm jaw carried by the jaw segment of the kinetic arm, the kinetic arm jaw disposed in parallel, spaced-apart and facing relation to the lifting arm jaw of the lifting arm subassembly; and
- an arm linkage pivotally engaging the kinetic arm;

an elongated pivoting lever upward-standing from the fulcrum and pivotally engaging the arm linkage of the kinetic arm subassembly, the lever operable to selectively displace the kinetic arm jaw toward and away from the lifting arm jaw by pivotal actuation of the arm linkage of the kinetic arm subassembly responsive to pivoting of the lever relative to the fulcrum;

an arm linkage pivotally connecting the lever and the main arm segment of the kinetic arm, the arm linkage having a first end pivotally connected to the lever and a second end pivotally connected to the main arm segment of the kinetic arm; and an arm engaging subassembly including:
- an arm engaging subassembly opening provided in the lifting arm;
- an arm engaging ball provided in the arm engaging subassembly opening;
- a ball detent provided in the kinetic arm;
- a compression spring in the arm engaging subassembly opening and engaging and normally urging the arm engaging ball into the ball detent to hold the kinetic arm jaw in an open, spaced-apart position relative to the lifting arm jaw; and
- a set screw threaded into the arm engaging subassembly opening and engaging the compression spring, the set screw configured to selectively vary resistance of the arm engaging ball against the ball detent.

17. The plant extracting assembly of claim 16 further comprising a slide bracket carried by the lifting arm of the lifting arm subassembly, and wherein the main arm segment of the kinetic arm extends through the slide bracket.

18. The plant extracting assembly of claim 16 wherein each of the lifting arm jaw and the kinetic arm jaw comprises a flat plate, and further comprising a plurality of gripping elements on each of the lifting arm jaw and the kinetic arm jaw.

* * * * *